United States Patent [19]

Godawski

[11] 4,454,572
[45] Jun. 12, 1984

[54] FLYBACK TRANSFORMER WITH IMPROVED REGULATION

[75] Inventor: Theodore J. Godawski, Des Plaines, Ill.

[73] Assignee: Zenith Radio Corporation, Glenview, Ill.

[21] Appl. No.: 382,525

[22] Filed: May 27, 1982

[51] Int. Cl.$^3$ .................. H02M 7/10; H01F 35/00
[52] U.S. Cl. ............................ 363/68; 363/126; 336/185
[58] Field of Search ................ 363/44, 45, 68, 75, 363/126; 336/185; 315/411

[56] References Cited

U.S. PATENT DOCUMENTS 3,947,749  3/1976  Kimura et al. .................. 363/126
4,112,337  9/1978  Nagasaki et al. ................ 315/411

FOREIGN PATENT DOCUMENTS 52-28624  3/1977  Japan ........................... 363/68
54-98524  8/1979  Japan ........................... 363/68

Primary Examiner—William H. Beha, Jr.

[57] ABSTRACT

A flyback transformer is described for use in television receivers, video monitors, and the like in which a video display device is scanned in accordance with a horizontal retrace frequency. The transformer includes a primary winding for receiving horizontal scan rate pulses and a plurality of secondary windings. The latter windings are tuned to selected harmonics of the horizontal retrace frequency such that at least two secondary windings develop horizontal rate pulses whose peaks are complimentary. The pulses developed by the secondary windings are combined so as to develop a composite pulse whose peak is substantially flat.

4 Claims, 5 Drawing Figures

FLYBACK TRANSFORMER WITH IMPROVED REGULATION

BACKGROUND OF THE INVENTION

This invention is directed to an improved high voltage flyback transformer for use in display devices such as television receivers and video monitors.

Conventional flyback transformers include a primary winding which receives horizontal scan rate pulses, and a secondary across which high voltage output pulses are developed. The output pulses are typically rectified to develop the high voltage required by a cathode ray tube.

In many cases, the transformer's secondary comprises four windings, each coupled to an adjacent winding by a diode as shown in FIG. 1, to which reference is now made. The illustrated transformer includes a primary winding 10 which receives horizontal scan rate pulses. The secondary includes windings 12, 14, 16, and 18 which are tuned to the ninth harmonic of the horizontal retrace frequency and coupled between ground and an output 20. A capacitor 22 which is shown coupled to the transformer's output represents the capacity of a cathode ray tube which normally receives the rectified high voltage developed by the transformer.

Diodes 24, 26, 28 and 30 are coupled between the various secondary windings as shown to provide a rectified voltage at the output 20.

Transformers such as those shown in FIG. 1 are preferably designed to provide a reasonably well regulated output voltage, particularly at low levels of anode current in the cathode ray tube. Toward this end, it is known that improved regulation results when the high voltage pulse developed by the transformer's secondary has a relatively flat top such as that shown by waveform B of FIG. 2. By providing such a flat top, the diodes can conduct for a longer interval of time and thereby provide the transformer with a lower output impedance. By way of contrast, waveform A of FIG. 2 illustrates the pulse output of a transformer that does not include provision for flattening the top of the output pulse.

The transformer of FIG. 1 is typical of those which generate a flat topped output pulse by including a tank circuit 32 in series with the primary winding 10. Although the tank circuit 32 provides the desired results, its inclusion is clearly undesirable from a cost standpoint.

Another conventional scheme for developing a flat-topped output pulse is to include a resistor between ground and the output 20 instead of using the tank circuit. This method also works, but the required resistor must be able to dissipate several watts. Again, the cost of the transformer is raised.

In certain applications, a focusing voltage for the cathode ray tube is obtained at a point 34 on the secondary. With the illustrated type of transformer the focusing volgage must ordinarily be filtered by including a high voltage capacitor between the point 34 and ground. Once again, the cost of the transformer is increased.

From the foregoing discussion, it can be seen that conventional flyback transformers require circuit components over and above the transformer itself in order to provide the desired outputs. Consequently, the cost of the transformer is substantially increased beyond what is desirable.

Accordingly, it is a general object of the invention to provide an improved high voltage flyback transformer.

It is a more specific object of the invention to provide a well regulated flyback transformer which is less costly than conventional transformers and which is preferably adapted to provide a focusing voltage without the need for extra filtering components.

BRIEF DESCRIPTION OF THE FIGURES

The objects stated above and other objects of the invention are set forth more particularly in the following detailed description of the accompanying drawings, of which.

DESCRIPTION OF THE PREFERRED EMBODIMENT

Figure 1:
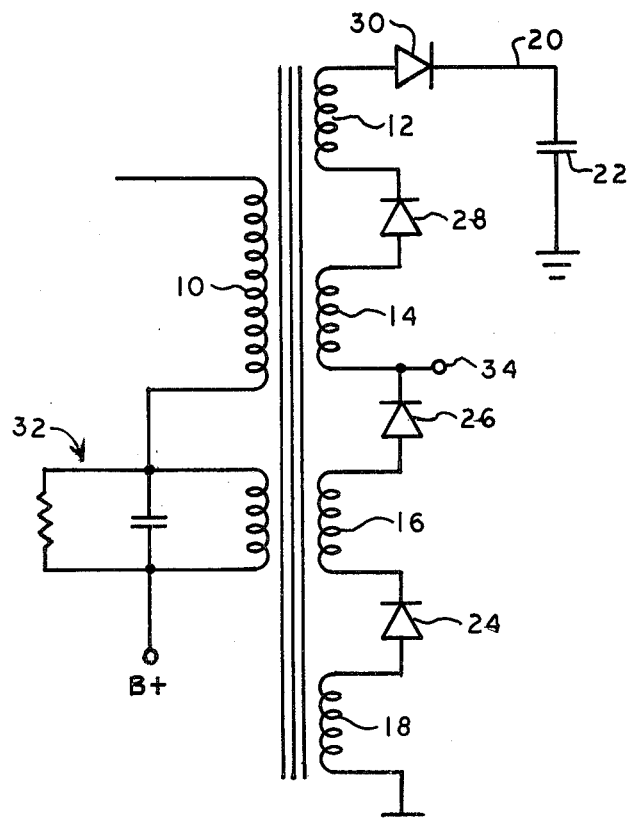
FIG. 1, previously referred to, illustrates a conventional flyback transformer.
Figure 2:
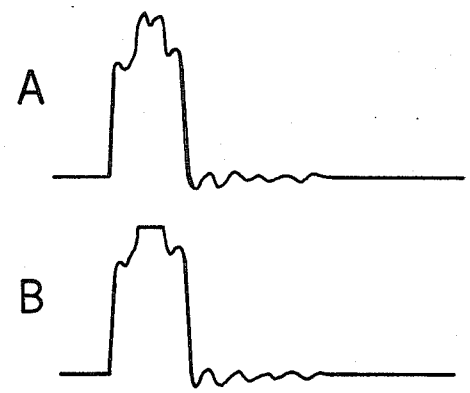
FIG. 2, also referred to previously, depicts waveforms useful in describing the operation of the transformer shown in FIG. 1.
Figure 3:
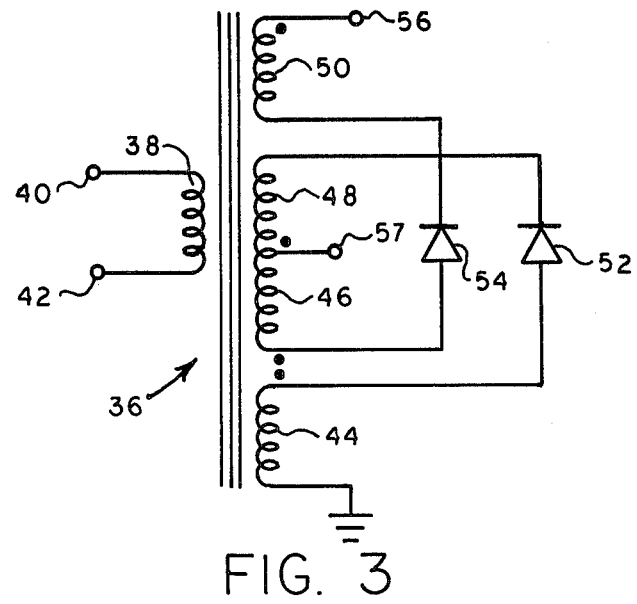
FIG. 3 depicts a flyback transformer in accordance with the invention for use in a color television receiver or monitor.

Referring now to FIG. 3, a high voltage flyback transformer 36 is shown which is constructed according to the invention. The illustrated transformer includes a primary winding 38 across which horizontal rate scan pulses may be applied via terminals 40 and 42. Such pulses may be found in any conventional television receiver and need not be discussed further except to say that those pulses will ordinarily be at a horizontal retrace frequency of about 45 kilohertz (i.e. one-half the reciprocal of the retrace time) in an N.T.S.C. type receiver.

When the transformer is to be used in a color television receiver or monitor, it preferably includes a first secondary winding 44, a second secondary winding 46, a third secondary winding 48, and a fourth secondary winding 50. As described in more detail below, the secondary windings are tuned to selected harmonics of the horizontal retrace frequency so that pairs of the secondary windings develop horizontal rate pulses whose peaks are complimentary. The complimentary outputs of each pair of secondary windings are combined so as to develop horizontal rate output pulses whose peaks are substantially flat. In this manner, no tank circuits or other additional circuit components are required to develop a flat-topped, high voltage output pulse.

Figure 4:
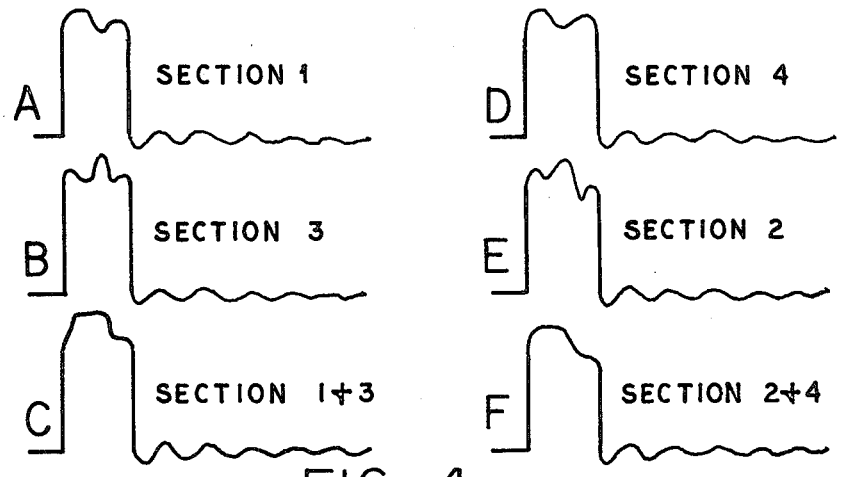
FIG. 4 illustrates various pulse waveforms which are useful in describing the operation of the transformer shown in FIG. 3.

In the illustrated embodiment, all the secondary windings have the same number of turns. For example, each secondary winding may have 860 turns. In addition, the windings 44 and 50 are preferably tuned to the fifth harmonic of the horizontal retrace frequency, and the windings 46 and 48 are preferably tuned to the seventh harmonic of the horizontal retrace frequency. The effect of this tuning is shown in FIG. 4 wherein the waveform A illustrates the pulse which is developed across the winding 44 (section 1 of the secondary), and waveform B illustrates the pulse which is developed across winding 48 (section 3 of the secondary). Note that the peaks of waveforms A and B are complimentary in that, when waveforms A and B are added together, the resultant waveforms, shown as waveform C, has a substantially flat peak or top.

The waveform D illustrates the pulse which is developed across the winding 50 (section 4 of the secondary) and waveform E illustrates the pulse which is developed across winding 46 (section 2 of the secondary). Once again, the peaks of waveforms D and E are complimentary in that, when added together, the resultant waveform F has a substantially flat peak or top.

To combine the voltages developed by the secondary windings, a first diode 52 is coupled between windings 44 and 48, and a second diode 54 is coupled between the windings 46 and 50 as shown. Also, the ends of windings 46 and 48 are coupled together at a terminal 57. Thus, the voltage across the entire secondary, that is, between ground and an output terminal 56, constitutes a high voltage which is rectified by the diodes 52 and 54. Because of the flat-topped pulses generated as shown in waveforms C and F, the diodes 52 and 54 conduct for a relatively long interval (during the flat top interval) such that the transformer exhibits a relatively low output impedance. Good regulation is thus achieved under conditions in which a cathode ray tube draws a small anode current from the terminal 56.

In addition to providing a relatively well regulated output voltage without the use of tank circuits or other additional circuit components, the transformer 36 also develops a voltage at the terminal 57 which may be used as the focus voltage for a cathode ray tube. Because of the orientation and tuning of the secondary windings and the fact that they have an equal number of turns, the terminal 57 carries a voltage which is substantially free of AC components. Hence, the voltage developed at the terminal 57 need not be filtered to provide a focus voltage. In other words, a virtual AC ground is present at the terminal 57.

One of the alternative methods of tuning the secondary windings to develop complimentary pulses includes tuning the windings 46 and 48 to the third harmonic of the horizontal retrace frequency while tuning the windings 44 and 50 to the fifth harmonic of the horizontal retrace frequency.

Another alternate construction may be used when the development of a virtual AC ground is not needed. Specifically, the voltages developed by windings 44 and 46 may be combined by coupling them together with a diode, and the voltages developed by windings 48 and 50 may be combined by coupling them together with another diode. In addition, the direction of the windings as indicated in FIG. 3 would be reversed. With this alternate construction, the outputs of each pair of secondary windings combine to develop a flat-topped pulse as shown by waveforms C or F of FIG. 4.

Figure 5:
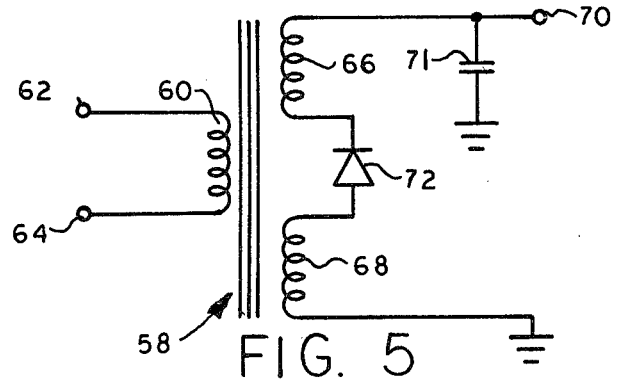
FIG. 5 depicts an alternate flyback transformer which is particularly useful for black and white television receivers and monitors.

The embodiment which is illustrated in FIG. 3 is particularly useful for generating a high voltage of about 26 to 30 thousand volts for use as the anode voltage in a color television receiver or a color monitor. Lower voltages such as those commonly used as anode voltages in black and white receivers or monitors may be developed by implementing the foregoing principles in a simpler transformer. FIG. 5 illustrates such a simpler transformer 58 for generating a high voltage of about 20 thousand volts.

The transformer 58 includes a primary winding 60 across which horizontal scan rate pulses may be applied via terminals 62 and 64. The transformer's secondary includes a pair of windings 66 and 68 which are coupled between ground on an output terminal 70. A capacitor 71 represents the capacity of a cathode ray tube which may be coupled to the terminal 70. A diode 72 is coupled in series between the windings 66 and 68.

Preferably, the winding 66 is tuned to the seventh harmonic of the horizontal retrace frequency while the winding 68 is tuned to the fifth harmonic of the horizontal retrace frequency. Thus, the pulse developed across the winding 66 has a peak which is complimentary to the peak of the pulse developed across the winding 68. The combined voltage between the terminal 70 and ground, therefore, comprises a high voltage output pulse having a substantially flat top. Good regulation is thus provided for the reasons stated previously.

In view of the foregoing disclosure, it will be appreciated that the present invention provides a flyback transformer whose construction is relatively simple and whose cost is relatively low. Fewer diodes are needed and extra circuit components are eliminated without degrading the transformer's performance.

It will be obvious to those skilled in the art that many alterations and modifications may be made without departing from the invention. Accordingly, it is intended that all such alterations and modifications be considered as within the spirit and scope of the invention as defined by the appended claims.

What is claimed is:

1. In a display device operating at a horizontal retrace frequency and having a high voltage flyback transformer for converting horizontal scan rate pulses to a high voltage output, an improved flyback transformer, comprising:

a primary winding for receiving the horizontal scan rate pulses;

first, second, third and fourth secondary windings, the first and fourth windings being tuned to the fifth harmonic of the horizontal retrace frequency, and the second and third windings being tuned to the seventh harmonic of the horizontal retrace frequency such that the peaks of the horizontal rate pulses developed by the first and fourth windings are complimentary to the peaks of the horizontal rate pulses developed by the second and third windings; and means for combining the outputs of the first and third windings and of the second and fourth windings so as to develop horizontal rate output pulses whose peaks are substantially flat.

2. A transformer as set forth in claim 1, wherein said means for combining the outputs of the windings includes a first diode coupled between the first and third windings and a second diode coupled between the second and fourth windings.

3. A transformer as set forth in claim 1 wherein pairs of secondary windings which are each tuned to different harmonics are coupled together to develop a focus voltage which includes no substantial AC component requiring filtering.

4. In a display device operating at a horizontal retrace frequency and having a high voltage flyback transformer for converting horizontal scan rate pulses to a high voltage output, an improved flyback transformer, comprising:

a primary winding for receiving the horizontal scan rate pulses;

first, second, third and fourth secondary windings, the first and fourth secondary windings being tuned to the fifth harmonic of the horizontal retrace frequency and the second and third secondary windings being tuned to the seventh harmonic of the horizontal retrace frequency;

a first diode coupling the first secondary winding such that a substantially flat-topped pulse is developed across the combination of the first and third windings; and a second diode coupling the second secondary winding to the fourth secondary winding such that a substantially flat-topped pulse is developed across the combination of the second and fourth windings, whereby the voltage across all four secondary windings corresponds to a high voltage pulse whose peak is substantially flat so that the diodes may conduct for a relatively long interval of time to provide the transformer with a relatively low output impedance.

* * * * *